United States Patent
Loeffler (10) Patent No.: US 7,590,477 B2
(45) Date of Patent: Sep. 15, 2009

(54) METHOD AND DEVICE FOR THE COORDINATED CONTROL OF MECHANICAL, ELECTRICAL AND THERMAL POWER FLOWS IN A MOTOR VEHICLE

(75) Inventor: Juergen Loeffler, Ludwigsburg (DE)

(73) Assignee: Robert Bosch GmbH, Stuttgart (DE)

(*) Notice: Subject to any disclaimer, the term of this patent is extended or adjusted under 35 U.S.C. 154(b) by 927 days.

(21) Appl. No.: 10/498,189

(22) PCT Filed: Sep. 7, 2002

(86) PCT No.: PCT/DE02/03339

§ 371 (c)(1),
(2), (4) Date: Jan. 25, 2005

(87) PCT Pub. No.: WO03/053730

PCT Pub. Date: Jul. 3, 2003

(65) Prior Publication Data

US 2005/0119813 A1 Jun. 2, 2005

(30) Foreign Application Priority Data

Dec. 8, 2001 (DE) ............... 101 60 480

(51) Int. Cl.
*B60G 23/00* (2006.01)
*B62C 3/00* (2006.01)
(52) U.S. Cl. ............. 701/36; 701/48; 701/53
(58) Field of Classification Search ........... 701/48, 701/54, 51; 903/930; 477/37
See application file for complete search history.

(56) References Cited

U.S. PATENT DOCUMENTS 5,027,302 A * 6/1991 Asanuma et al. ........... 701/48

(Continued)

FOREIGN PATENT DOCUMENTS

DE 199 01 470 7/1999

(Continued)

*Primary Examiner*—Khoi Tran
*Assistant Examiner*—Bhavesh V Amin
(74) *Attorney, Agent, or Firm*—Kenyon & Kenyon LLP (57) ABSTRACT

A method for the coordinated control of mechanical, electrical and thermal power flows in a motor vehicle for bringing about optimum operating states of units in the motor vehicle, and a device for carrying out the method. An optimum operating state ($x_{opt}$) for the unit system is determined in a module which receives as input variables at least the setpoint values provided by a second module after the variables determined by a third module have been combined together with additional specified variables in the second module, and the actual operating state (x) from a fourth module after the measured variables (y) resulting from the determination of the state of the units of the unit system have been combined in the fourth module; and after the optimum operating state ($x_{opt}$) for the unit system is determined, the setpoint operating state ($x_{setpoint}$) is determined in a fifth module, based on the actual operating state (x) and the optimum operating state ($x_{opt}$), so that due to this fifth module, a smooth transition is effected between the instantaneous operating state (x) and the operating state ($x_{opt}$) to be achieved.

13 Claims, 4 Drawing Sheets

U.S. PATENT DOCUMENTS

| | | | | |
|---|---|---|---|---|
| 5,508,929 | A * | 4/1996 | Harada | 701/48 |
| 6,278,925 | B1 * | 8/2001 | Wozniak | 701/54 |
| 6,389,347 | B1 * | 5/2002 | Nozaki | 701/54 |
| 6,440,037 | B2 * | 8/2002 | Takagi et al. | 477/37 |
| 6,470,252 | B2 * | 10/2002 | Tashiro et al. | 701/51 |
| 2001/0056318 | A1 * | 12/2001 | Tashiro et al. | 701/48 |

FOREIGN PATENT DOCUMENTS

| | | |
|---|---|---|
| DE | 100 37 184 | 2/2001 |
| DE | 101 20 025 | 11/2001 |
| WO | 01 56824 | 8/2001 |

* cited by examiner

METHOD AND DEVICE FOR THE COORDINATED CONTROL OF MECHANICAL, ELECTRICAL AND THERMAL POWER FLOWS IN A MOTOR VEHICLE

FIELD OF THE INVENTION

The present invention relates to a method for the coordinated control of mechanical, electrical and thermal power flows in a motor vehicle, such as, for example, the drive power to the wheels, the rear window heating and the interior climate control, for optimizing the consumption, comfort, emissions and dynamic vehicle response, and therefore for bringing about optimum operating states of units in the motor vehicle, including the storage systems, converters, transformers and the units for dissipating energy; the invention also relates to a device for carrying out the method for continuous control.

BACKGROUND INFORMATION

A number of conventional methods and devices for carrying out these methods exist for controlling power flows in a motor vehicle. DE 197 03 863 A1, for example, describes a method and a device by which a drive control is carried out, thus mechanical power flows in the motor-vehicle drive are controlled (see also Hötzer, D.: *Entwicklung einer Schaltstrategie für einen PKW mit automatischem Schaltgetriebe* (translated as "Development of a Shifting Strategy for a Passenger Vehicle with Automatic Transmission"), Expert Verlag, Renningen, 1999). Regardless of how these methods operate, their goal is always to minimize the fuel consumption and optimize the vehicle response, which can be achieved by coordinated control of the internal combustion engine and the vehicle drive.

Other systems control thermal power flows in a motor vehicle, in particular systems for thermal management and climate control, and yet other system control electrical power flows in the onboard electrical system such as systems for electrical energy management and for load management, as described for example in the article by Schöttle, R. and Schramm, D., *Zukünftige Energiebordnetze im Kraftfahrzeug* (translated as "Future Onboard Energy Networks in Motor Vehicles"), Fahrzeug-und Verkehrstechnik ("Automotive and Traffic Engineering") Yearbook, VDI-Verlag, Dusseldorf, 1997.

However, conventional methods and systems share the common feature that they are principally concerned with only one form of energy in the mechanical, electrical, or thermal power flows in a motor vehicle, and, therefore, essentially do not take into account the physical linkage provided in a motor vehicle between these forms of energy.

SUMMARY

The present invention provides a method and a device for the coordinated control of mechanical, electrical and thermal power flows in a motor vehicle for optimizing consumption, comfort, emissions and vehicle response such that, by physically linking the storage systems for mechanical, electrical, thermal and chemical energy, the converters for converting the energy between these forms of energy, the converters for converting the energy within one of the particular forms of energy, and the units for dissipating energy of all forms, all forms of energy present in a motor vehicle are taken into account.

These advantages are achieved by a method in which an optimum operating state $x_{opt}$ for a unit system is determined in a "determination of optimum operating state" module which receives as input variables at least the setpoint values provided by a "generation of setpoint variables" module after the variables determined by a "detection of driver intent" module have been combined together with additional specified variables in the "generation of setpoint variables" module, as well as actual operating state x from a "determination of actual operating state" module after measured variables y resulting from the determination of the state of the units of the unit system have been combined in the "determination of actual operating state" module; and after optimum operating state $x_{opt}$ for the unit system is determined, setpoint operating state $x_{setpoint}$ is determined in a "determination of setpoint operating state" module based on actual operating state x and optimum operating state $x_{opt}$, so that a smooth transition is effected between instantaneous operating state x and operating state $x_{opt}$ to be achieved.

The unit system is actuated by a vector of manipulated variables u, each actuated unit having an input for control signals. Thus, ume stands for a converter of mechanical to electrical energy. Vector of manipulated variables u is determined by an "actuation of unit system" module in such a way that operating state $x_{setpoint}$ is established in the unit system. The actual control of the units of the unit system may be achieved in each particular case by a control unit—e.g., ME, EDC, or inverter control.

While measured variables y by which the state of the units of the unit system is detected are determined directly by sensors or, when measured variables y include derived variables, may be determined by unit control units, physical computational models are used for describing the units, and thus the unit system, when combining measured variables y and determining actual operating state x of the unit system in the "determination of actual operating state" module.

When the method according to one embodiment of the present invention is carried out, variables ascertained by driver-assistance systems, for example by a vehicle-speed controller or ACC, may be supplied by them as further specified variables to the "generation of setpoint variables" module. However, since the variables detected in the "detection of driver intent" module which result from the request for drive power to the wheels, the request for electrical power which the onboard electrical system must provide for operating electrical consumers such as headlights, rear window heating and radio, and the request for thermal power for the interior climate control may also be supplied to the "generation of setpoint variables" module as well, these variables are combined, together with the variables determined by the driver assistance systems, in the "generation of setpoint variables" module. Setpoint variables for mechanical power $P_{m,setpoint}$, electrical power $P_{e,setpoint}$, and thermal power $P_{t,setpoint}$ are determined by this "generation of setpoint variables" module.

For determining an optimum operating state $x_{opt}$, information about the type of driver, the driving conditions and environmental variables also may be provided to the "determination of optimum operating state" module by a parameter vector a after detection by an additional module.

According to a further embodiment of the present invention, for determining optimum operating state $x_{opt}$ in the "determination of optimum operating state" module, multiple possible operating states $x_k$ may be determined in real time during vehicle operation, so that the unit system supplies required mechanical power $P_{m,setpoint}$, required electrical power $P_{e,setpoint}$, and required thermal power $P_{t,setpoint}$. Operating states $x_k$ are selected so that they satisfy the physical linkages, the limits of the storage systems and the capacity of the units, a generalized consumption V being determined for each operating state $x_k$ according to the computing rule:

$$V = \varepsilon_c * v_c(a) * dE_c/dt + \varepsilon_m * v_m(a) * dE_m/dt +$$
$$\varepsilon_e * v_e(a) * dE_e/dt + \varepsilon_t * v_t(a) * dE_t/dt$$

Likewise, for each operating state $x_k$ the value of a power function $\Gamma$ is determined according to the computing rules:

$$G(x) = Y1(a)*G1(x) + Y2(a)*G2(x) + Y3(a)*G3(x) + Y4(a)*G4(x) +$$
$$Y5(a)*G5(x) + Y6(a)*G6(x) + Y7(a)*G7(x) + Y8(a)*D8(x)$$

and $$\Gamma(x) = V(x) - G(x) + \Delta P(x),$$

operating state $x_k$ for which power function $\Gamma$ assumes a minimum value being determined as optimum operating state $x_{opt}$.

In an alternative embodiment, for determining optimum operating state $x_{opt}$ in the "determination of optimum operating state" module, a second variant or another method step may be implemented, according to which in offline optimization calculations, optimum operating state $x_{opt}$ which minimizes power function $\Gamma$ is determined for each vehicle speed v and each required combination of required mechanical power $P_{m,setpoint}$, required electrical power $P_{e,setpoint}$, and required thermal power $P_{t,setpoint}$, the determination being made for various values of parameter a. Optimum operating state $x_{opt}$ is stored in a multidimensional characteristic map which is implemented in the "determination of optimum operating state" module and which contains input variables v, $P_{m,setpoint}$, $P_{e,setpoint}$, $P_{t,setpoint}$ and a, the output variable being optimum operating state $x_{opt}$.

For carrying out the method for the coordinated control of mechanical, electrical and thermal power flows in a motor vehicle, the present invention also provides for a device in which an engine control associated with the internal combustion engine, a control, preferably in the form of a pulse-controlled inverter, associated with the electric machine, and a transmission control associated with the automatic transmission are connected via a CAN system to a vehicle control device in which the method according to the present invention is implemented, the position of the accelerator pedal and thus the driver's request for mechanical power $P_{m,setpoint}$ for the drive being derivable using the vehicle control device. The vehicle control device specifies setpoint engine torque $M_{m,setpoint}$ for the engine control, setpoint torque $M_{e,setpoint}$ of the electric machine for the pulse-controlled inverter, and setpoint gear $g_{setpoint}$ for the transmission control. In addition, by use of this device, electrical power requirement $P_{e,setpoint}$ of the electrical consumers, as well as that of the pulse-controlled inverter connected to the onboard electrical system and that of the battery, may be determined by the vehicle control device.

DETAILED DESCRIPTION

Figure 1:
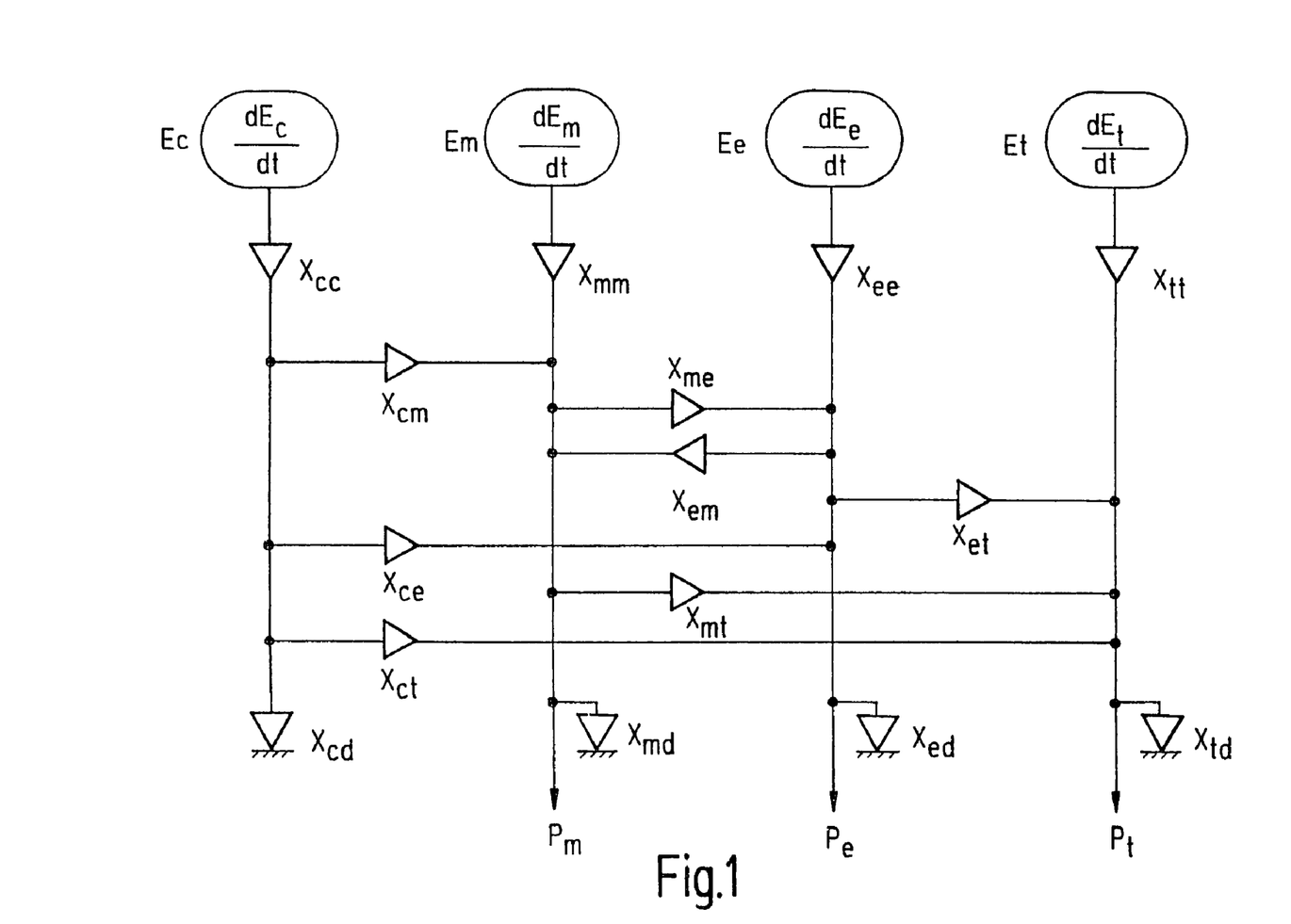
FIG. 1 depicts a system diagram of the units of the unit system of a motor vehicle, and the physical interconnection of these units, according to one embodiment of the present invention.

The unit system according to FIG. 1 provides mechanical power $P_m$, electrical power $P_e$, and thermal power $P_t$. The unit system may include chemical, mechanical, electrical and thermal storage units whose energy contents may each increase, decrease, or remain constant. The energy content of the chemical storage may be represented by $E_c$, that of the mechanical storage by $E_m$, that of the electrical storage by $E_e$, and that of the thermal storage by $E_t$. The rate of change of the energy content of the chemical storage is $dE_c/dt$, that of the mechanical storage $dE_m/dt$, that of the electrical storage $dE_e/dt$, and that of the thermal storage $dE_t/dt$. The operating state of each of the units may be characterized by a vector $x_i$ whose elements describe the state variables of the unit, for example rotational speed, torque, temperature and electrical current. For example:

The operating state of a converter of chemical to mechanical energy, an internal combustion engine, for example, is described by $x_{cm}$;

The operating state of a converter of mechanical to electrical energy, a generator, for example, is described by $x_{me}$;

The operating state of a converter of electrical to mechanical energy, an electric drive motor, for example, is described by $x_{em}$;

The operating state of a converter of electrical to thermal energy, an electric heating device, for example, is described by $x_{et}$;

The operating state of a converter of chemical to electrical energy, a fuel cell, for example, is described by $x_{ce}$;

The operating state of a converter of mechanical to thermal energy, a shaft bearing which must be cooled, for example, is described by $x_{mt}$; and The operating state of a converter of chemical to thermal energy, an auxiliary heater, for example, is described by $x_{ct}$.

The operating state of the transformers is described in an analogous manner. For example:

The operating state of a chemical transformer, a methanol to hydrogen reformer, for example, is described by $x_{cc}$;

The operating state of a mechanical transformer, an automatic transmission, for example, is described by $x_{mm}$;

The operating state of an electrical transformer, a DC converter, for example, is described by $x_{ee}$; and The operating state of a thermal transformer, a heat exchanger, for example, is described by $x_{tt}$.

Each of the units, including the storage systems, converters and transformers, may appear multiple times in the unit system. Accordingly, additional operating states $x_i$ are used for the description.

One unit may also convert multiple forms of energy. Thus, an internal combustion engine converts chemical energy into mechanical and thermal energy. The state of such a unit is likewise uniquely described by an operating state, for example $x_{cmt}$.

The unit system may provide multiple outputs for mechanical, electrical and/or thermal energy. Thus, for example, a unit system having a 14/42 V dual-voltage onboard electrical system is provided both with an output for 14 V electrical consumers and an output for 42 V electrical consumers. Multiple mechanical outputs are possible as well, for example in utility vehicles having auxiliary drives.

The quantity of operating states $x_i$ of the units and the energy contents of the storage systems may describe the overall operating state x of the unit system according to computing rule 1:

$$x = (E_c, E_m, E_e, E_t, x_{cm}, x_{ce}, x_{ct}, x_{cc},$$
$$x_{cd}, x_{me}, x_{mt}, x_{mm}, x_{md}, x_{em}, x_{et}, x_{ee}, x_{ed}, x_{tt}, x_{td}).$$

Figure 2:
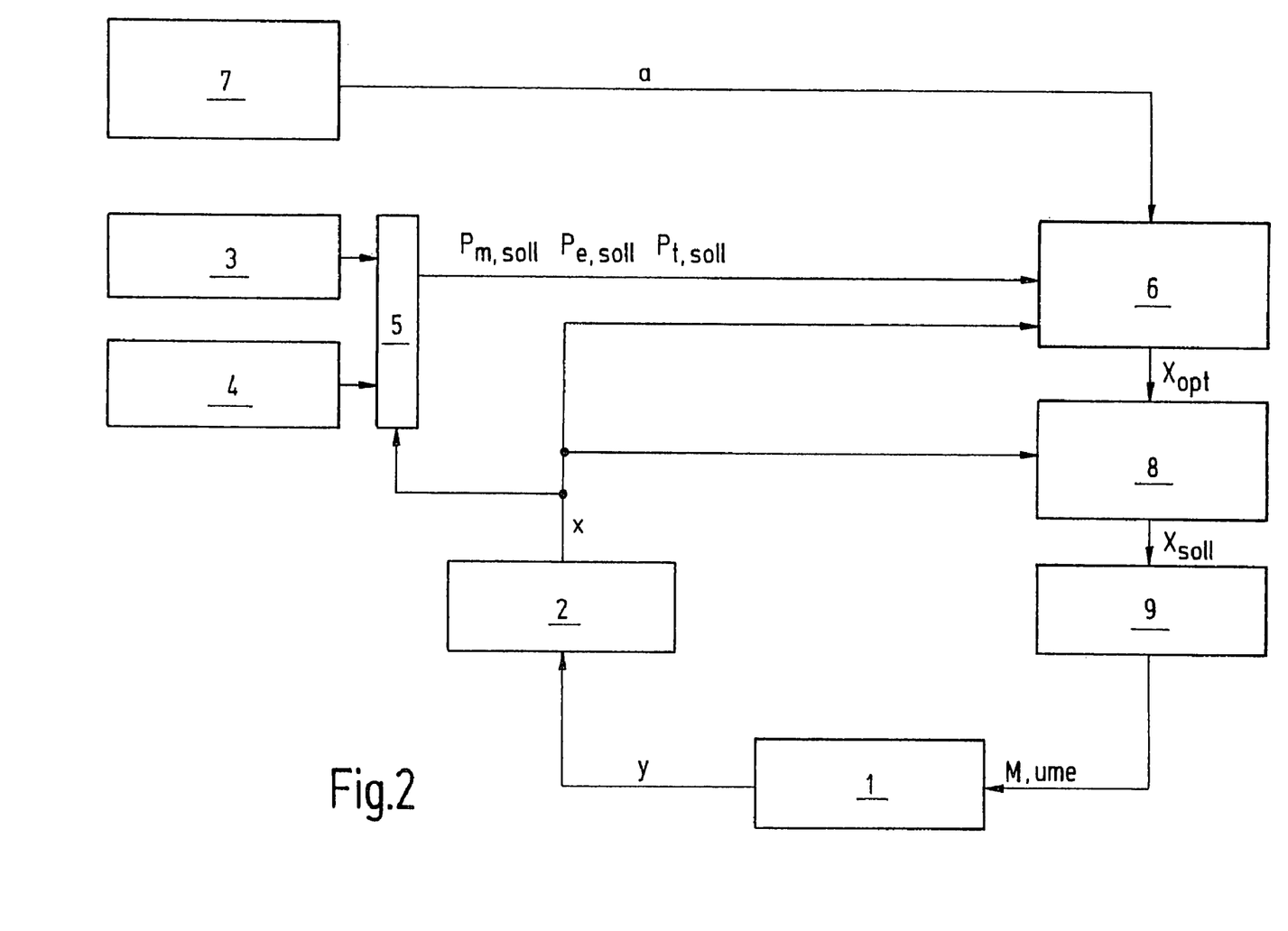
FIG. 2 depicts a schematic flow diagram of a control system by which the method for coordinated control of the power flows in a motor vehicle is realized according to one embodiment of the present invention.

In the control system for coordinated control of the power flows and states of the unit system according to FIG. 2, unit system 1 is actuated by a vector of manipulated variables u. Each actuated unit has an input for control signals, for example ume for a converter of mechanical to electrical energy. The actual control of the unit may be achieved in each particular case by a control unit, for example ME, EDC, or inverter control. The state of the units of unit system 1 is determined by a vector of measured variables y. These measured variables may be ascertained directly by sensors (not further described), or also may include derived variables that are determined by unit control units. Measured variables y are combined, and actual operating state x of unit system 1 is determined in a "determination of actual operating state" module 2. To this end, physical computational models may be used for describing the units and unit system 1, including for example observers.

The driver's intent is detected in a "detection of driver intent" module 3. This module detects in particular the request for drive power to the wheels, the request for electrical power which the onboard electrical system must provide for operating electrical consumers such as headlights, rear window heating and radio, and the request for thermal power for the interior climate control. Driver assistance systems 4 may also generate specified variables. They are combined with the variables determined by the "detection of driver intent" module 3 in a "generation of setpoint variables" module 5. This module determines setpoint variables for mechanical power $P_{m,setpoint}$, electrical power $P_{e,setpoint}$, and thermal power $P_{t,setpoint}$. Each of these setpoint variables may appear multiple times.

"Determination of optimum operating state" module 6 forms the core of the control system. This module determines an optimum operating state $x_{opt}$ for unit system 1. It receives as input variables the setpoint values from "generation of setpoint variables" module 5, and receives actual operating state x from "determination of actual operating state" module 2. In addition, information about the type of driver, the driving conditions, and environmental variables is used which is provided by a module 7 via a parameter vector a.

A "determination of setpoint operating state" module 8 determines setpoint operating state $x_{setpoint}$ based on actual operating state x and optimum operating state $x_{opt}$. This module 8 may help ensure a smooth transition between instantaneous operating state x and the optimum operating state $x_{opt}$ to be achieved. An "actuation of unit system" module 9 determines a vector of manipulated variables u in such a way that operating state $x_{setpoint}$ is established in unit system 1.

Assuming that the method according to the present invention optimizes consumption, comfort, emissions and dynamic vehicle response, a generalized consumption V may be determined according to computing rule 2:

$$V = \varepsilon_c * v_c(a) * dE_c/dt + \varepsilon_m * v_m(a) * dE_m/dt +$$
$$\varepsilon_e * v_e(a) * dE_e/dt + \varepsilon_t * v_t(a) * dE_t/dt$$

Factors $\varepsilon$ are energy equivalence numbers which describe the varying rate of usability of the stored energies. Thus, the energy stored in the storage for mechanical energy has a higher energy equivalence number than the chemical energy stored in the fuel tank. The values of the energy equivalence numbers may be adapted on a long-term basis during vehicle operation.

Factors v(a) are weighting factors which weight the changes in the energy content of the individual storage units. Their values are determined as a function of a parameter vector a. This parameter vector a describes, among other things, the type of driver (sporty, economical), the driving conditions (curve, city driving), and environmental variables (grade, roadway class, temperature). Environmental variables may also include information about the course of the roadway ahead and information which telematic systems are able to provide, in particular curvature of the roadway ahead, grade of the roadway ahead, distance to the next intersection, etc.

Generalized quality gauges $G_i$ for optimizing dynamic vehicle response, emissions and comfort may be defined as a function of operating state x of unit system 1. For example:

A quality gauge G1(x) describes the dynamic power reserve for mechanical energy with respect to an operating state x. The dynamic power reserve for mechanical energy indicates what additional mechanical energy—beyond mechanical energy $P_{m(x)}$ supplied for operating state x—unit system 1 is able to provide for operating state x with high time dynamics. For a vehicle drive with an electric motor and an internal combustion engine, the dynamic power reserve for mechanical energy depends, for example, on the maximum power of the internal combustion engine for the internal combustion engine speed at operating state x, on the maximum power of the electric motor at the electric motor speed for operating state x, and the charge state of the battery.

A quality gauge G2(x) describes the dynamic power reserve for electrical energy in connection with an operating state x. The dynamic power reserve for electrical energy indicates what additional electrical energy—beyond electrical energy $P_{e(x)}$ supplied for operating state x—the unit system is able to provide for operating state x with high time dynamics.

A quality gauge G3(x) describes the dynamic power reserve for thermal energy for an operating state x. The dynamic power reserve for thermal energy indicates what additional thermal energy—beyond thermal energy $P_{t(x)}$ supplied for operating state x—unit system 1 is able to provide for operating state x with high time dynamics.

A quality gauge G4(x) describes the emission of air pollutants (HC, CO, $NO_x$) for an operating state x. Large values for G4(x) may be obtained for low emissions.

A quality gauge G5(x) describes the noise emissions in the vehicle surroundings for an operating state x, large values for G5(x) may be obtained for low noise emissions.

A quality gauge G6(x) describes the vibrational comfort for the vehicle passengers for an operating state x. A large value for G6(x) may correspond to a high comfort level.

A quality gauge G7(x) describes the sound emissions in the vehicle interior for an operating state x. A large value for G7(x) may correspond to low sound emissions.

A quality gauge G8(x) describes the wear on the units and storage units for an operating state x. A low rate of wear, i.e., a long operating life, may be described by large values for G8(x).

An overall quality gauge G(x) may be determined according to computing rule 3:

$$G(x) = Y1(a)*G1(x) + Y2(a)*G2(x) + Y3(a)*G3(x) + Y4(a)*G4(x) + Y5(a)*G5(x) + Y6(a)*G6(x) + Y7(a)*G7(x) + Y8(a)*G8(x)$$

The values of weighting factors γ(a) are determined as a function of parameter vector a.

For optimizing consumption, comfort, emissions and vehicle response, the method according to one embodiment of the present invention minimizes a power function according to computing rule 4:

$$\Gamma(x) = V(x) - G(x) + \Delta P(x).$$

Power deviation ΔP(x) describes the deviation of the powers supplied by unit system 1 from the setpoint powers according to computing rule 5, as follows:

$$\Delta P(x) = \prod m(a)*(Pm, \text{setpoint} - Pm(x)) + \prod e(a)*(Pe, \text{setpoint} - Pe(x)) + \prod t(a)*(Pt, \text{setpoint} - Pt(x)).$$

Weighting factors πm(a), πe(a) and πt(a) are set as a function of parameter vector a.

Alternatively, two different methods may be carried out for determining optimum operating state $x_{opt}$ in "determination of optimum operating state" module 6 according to one embodiment of the present invention:

1. Multiple possible operating states $x_k$ may be determined in real time during vehicle operation, so that the unit system provides required mechanical power $P_{m,setpoint}$, required electrical power $P_{e,setpoint}$, and required thermal power $P_{t,setpoint}$. Operating states $x_k$ may be selected so that they satisfy the physical linkages, the limits of the storage systems, and the capacity of the units. A generalized consumption V may be determined for each operating state $x_k$ according to computing rule 2. Likewise, the value of a power function Γ may be determined for each operating state $x_k$ according to computing rules 3 and 4. The operating state for which the power function assumes a minimum value is specified as optimum operating state $x_{opt}$.

2. In offline optimization calculations, for each vehicle speed v and for each required combination of required mechanical power $P_{m,setpoint}$, required electrical power $P_{e,setpoint}$, and required thermal power $P_{t,setpoint}$, optimum operating state $x_{opt}$ is determined which minimizes power function Γ. The determination may be made for various values of parameter a. Optimum operating state $x_{opt}$ may be stored in a multidimensional characteristic map which contains input variables v, $P_{m,setpoint}$, $P_{e,setpoint}$, $P_{t,setpoint}$, and a. The output variable of the multidimensional characteristic map may be optimum operating state $x_{opt}$. The multidimensional characteristic map is implemented in "determination of optimum operating state" module 6.

Figure 3:
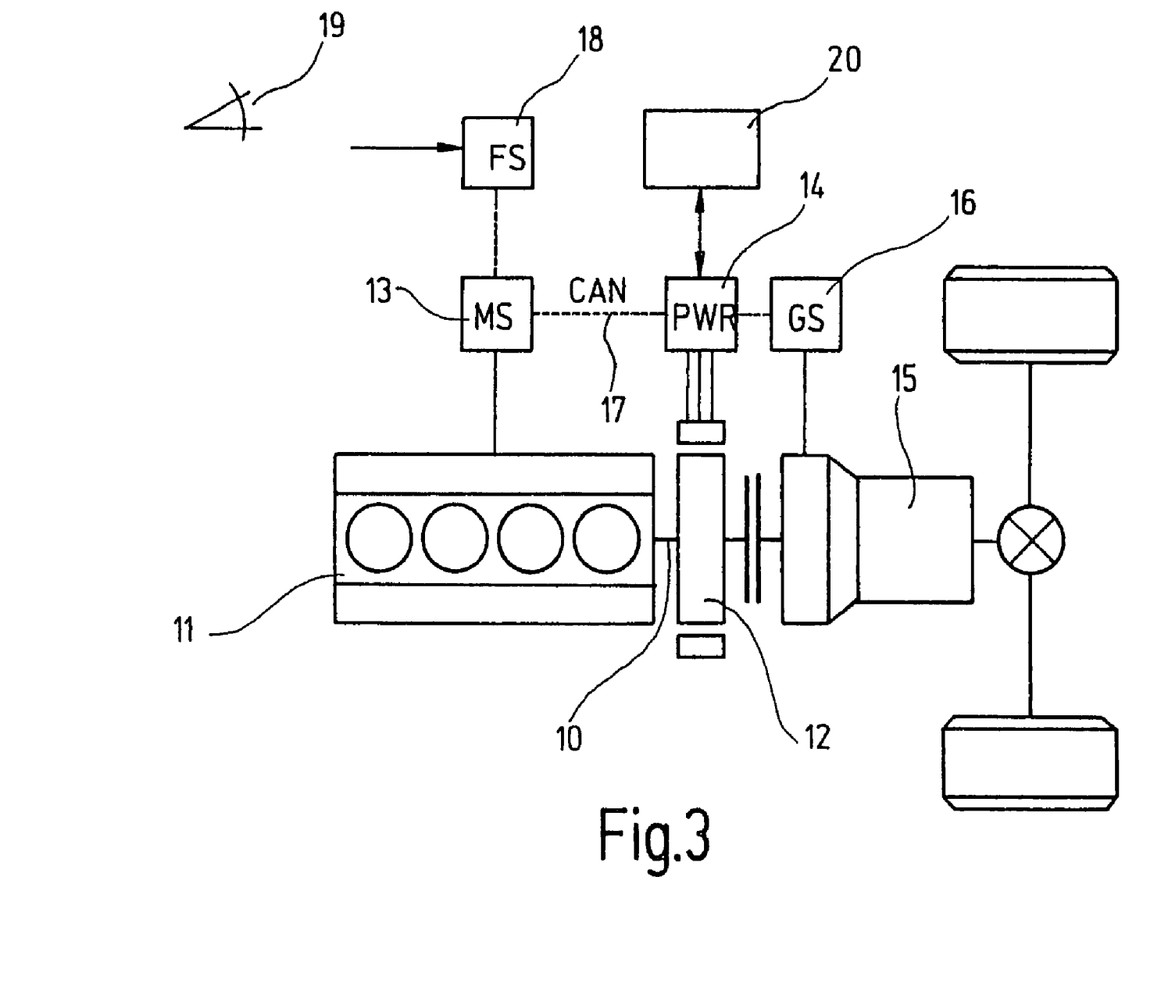
FIG. 3 depicts a block diagram of the technical implementation of the method for the drive train of a motor vehicle according to one embodiment of the present invention.

The implementation of the method for coordinated control of mechanical, electrical and thermal power flows in a motor vehicle is described in one embodiment shown in FIG. 3 based on the drive train of the motor vehicle having an electric machine 12 situated on crankshaft 10 of internal combustion engine 11, thus a crankshaft start generator. Whereas internal combustion engine 11 is controlled by engine control 13, electric machine 12 is controlled by a pulse-controlled inverter 14. Automatic transmission 15 is controlled by transmission control 16. This control, in addition to engine control 13 and pulse-controlled inverter 14, are connected via a CAN system 17 to a vehicle control device 18 in which the method according to the present invention is carried out. Vehicle control device 18 determines the position of accelerator pedal 19 and from it, deduces the driver's request for mechanical power $P_{m,setpoint}$ for the drive. Vehicle control device 18 specifies setpoint engine torque $M_{m,setpoint}$ for engine control 13 and specifies setpoint torque $M_{e,setpoint}$ of electric machine 12 for pulse-controlled inverter 14. Setpoint gear $g_{setpoint}$ is specified for transmission control 16. Pulse-controlled inverter 14 is connected to the onboard electrical system, to which the electrical consumers and a battery 20 are also connected. Vehicle control device 18 may determine, via electrical consumer devices, the need for electrical power $P_{e,setpoint}$ by the electrical consumers.

The determination of optimum operating state $x_{opt}$ in "determination of optimum operating state" module 6 according to FIG. 2 is described below with reference to the schematic flow diagram according to one embodiment of the present invention shown in FIG. 4.

Setpoint transmission output torque $M_{ga,setpoint}$ is determined from required mechanical power $P_{m,setpoint}$ according to computing rule $M_{ga,setpoint} = P_{m,setpoint}/\text{nga}$, where nga is the transmission output speed. Setpoint transmission input torque $M_{ge,setpoint}$ is calculated to be $M_{ge,setpoint} = M_{ga,setpoint}/\text{mueg}$, where mueg denotes the torque amplification of automatic transmission 15 at the instantaneously engaged gear.

For the drive train shown in FIG. 3, the following relationship according to computing rule 6

$$M_{ge} = M_m + M_e$$

is valid, where $M_m$ describes the effective engine torque and $M_e$ describes the torque of electric machine 12. The operating state of unit system 1 is characterized by computing rule 7

$$x = (M_m, M_e, g, nga)$$

where g describes the engaged transmission gear and nga describes the transmission output speed. Engine speed nm and speed ne of electric machine 12 are equal, and are specified by gear g and transmission output speed nga.

Possible operating states $x_k$ are determined by varying torque $M_e$ of electric machine 12, within the limits of the characteristic curve for the minimum and maximum torque, in discrete steps using an applicable increment.

Electrical power $P_{elm}$ of electric machine 12 results from torque $M_e$ and speed ne of electric machine 12, using a characteristic map. Positive torques (machine operating in drive mode) result in electrical power consumption ($P_{elm} < 0$). Negative torques (machine operating in generator mode) result in electrical power output ($P_{elm} > 0$). The electrical power output of battery 20 is calculated from required electrical power $P_{e,setpoint}$ and the power consumed/output by electric machine 12, according to computing rule 8:

$$P_{batt} = P_{elm} - P_{e,setpoint}$$

Subsequently, only operating states $x_k$ for which $P_{batt}$ is in a predetermined interval are pursued further. This interval may be set as a function of charge state SOC of battery 20.

From $P_{batt}$, $dE_e/dt$ is determined using an efficiency characteristic map for battery 20. $dE_c/dt$ is determined from the setpoint engine torque obtained according to computing rule 9

$$M_{m,setpoint} = M_{ge,setpoint} = M_e$$

and a consumption characteristic map of internal combustion engine 11. Variables $dE_m/dt$ and $dE_t/dt$ are set to zero in the application example. Using computing rules 2, 3, and 4, the operating state $$x_k = ((M_{ge,setpoint} - M_{e,k}), (M_{e,k}), g, nga)$$

is selected for which $\Gamma$ assumes a minimum. Setpoint operating state $x_{setpoint}$ is set equal to optimum operating state $x_{opt}$. The manipulated variables for the units, determined in "actuation of unit system" module 9 in FIG. 2, are $M_{m,setpoint}$, $M_{e,setpoint}$ and $g_{setpoint}$.

In the described sequence, gear $g_{setpoint}$ is not varied; rather, it is assumed that the gear is predetermined from an arithmetic block for transmission control. However, in a further advantageous embodiment the setpoint gear may be determined by the optimization method in "determination of optimum operating state" module 6 according to FIG. 2. To this end, the above-described computing steps are performed for the instantaneous gear as well as for the next higher and next lower gear. The gear for which power function $\Gamma$ assumes a minimum is determined as the optimum gear.

Figure 4:
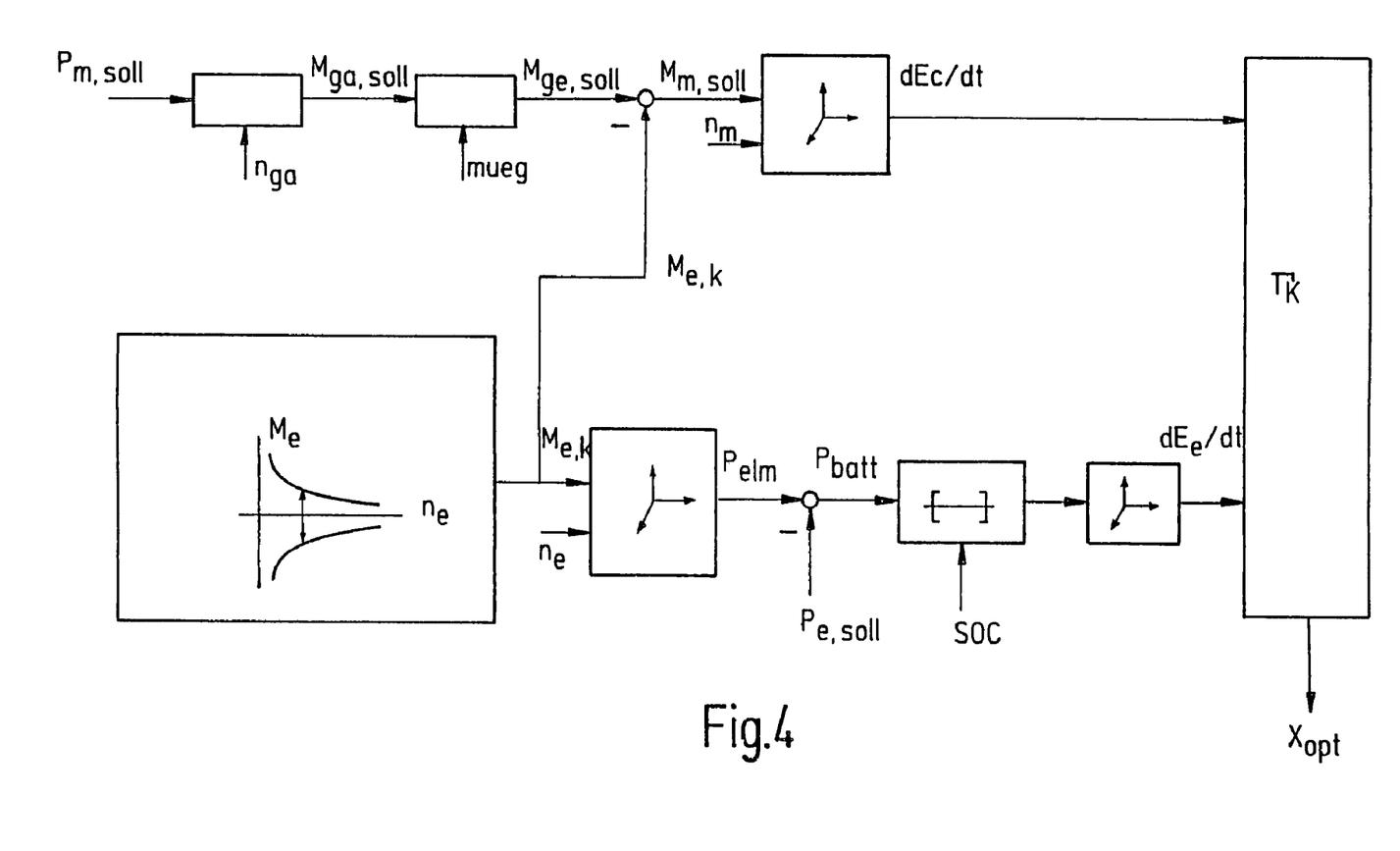
FIG. 4 depicts a schematic flow diagram for determining the optimum operating state in the "determination of optimum operating state" module shown in FIG. 2 according to one embodiment of the present invention.

Key to FIGS. 2 and 4:
soll=setpoint

What is claimed is:

1. A method for a coordinated control of mechanical, electrical and thermal power flows in a motor vehicle bringing about optimum operating states of at least one unit in the motor vehicle, the method comprising:
    determining, in a "detection of driver intent" module, at least one driver intent variable;
    generating, in a generation of setpoint variables module, at least one setpoint value as a function of combining the at least one driver intent variable and an additional specified variable;
    determining, in a determination of actual operating state module, an actual operating state as a function of at least one measured variable, the at least one measured variable determined from the state of the at least one unit of the unit system;
    determining, in a determination of optimum operating state module, an optimum operating state for a unit system as a function of the at least one setpoint value and the actual operating state; and
    determining, in a determination of setpoint operating state module, a setpoint operating state for the unit system as a function of the actual operating state and the optimum operating state, wherein the setpoint operating state is used to generate a smooth transition between the actual operating state and the optimum operating state;
    wherein the determining, in the determination of optimum operating state module, the optimum operating state step includes determining a plurality of possible operating states in real time during a vehicle operation so that the unit system supplies a required mechanical power, a required electrical power, and a required thermal power, and wherein the possible operating states are selected in order to satisfy physical linkages, limits of the storage systems and capacities of the units, a generalized consumption determined for each operating state according to a computing rule:

$$V = \varepsilon_c * v_c(a) * dE_c/dt + \varepsilon_m * v_m(a) * dE_m/dt + \varepsilon_e * v_e(a) * dE_e/dt + \varepsilon_t * v_t(a) * dE_t/dt.$$

2. The method according to claim 1, wherein the unit system is actuated by a vector of manipulated variables, an actuated unit having an input for a control signal.

3. The method according to claim 2, wherein the vector of manipulated variables is determined by an actuation of unit system module in order to establish the setpoint operating state in the unit system.

4. The method according to claim 3, wherein the at least one unit of the unit system is controlled by a control unit.

5. The method according to claim 4, wherein the measured variable is at least one of ascertained directly by a sensor and, when the measured variable includes a derived variable, determined by the unit control unit.

6. The method according to claim 5, wherein a physical computational model describes the at least one unit and the unit system when combining the measured variable and determining the actual operating state of the unit system in the determination of actual operating state module.

7. The method according to claim 6, wherein the additional specified variable is ascertained by a driver-assistance system, including at least one of a vehicle-speed controller and an ACC, and is supplied by the driver-assistance system to the generation of setpoint variables module.

8. The method according to claim 6, wherein the additional specified variable is detected in the detection of driver intent module as a function of at least one of a request for drive power to the wheels, a request for electrical power which the onboard electrical system provides for operating electrical consumers, and a request for thermal power for an interior climate control.

9. The method according to claim 7, wherein a setpoint variable for mechanical power, a setpoint variable for electrical power, and a setpoint variable for thermal power are determined by the generation of setpoint variables module.

10. The method according to claim 9, wherein a data item, detected by an additional module, including information about at least one of a type of driver, a driving condition, and an environment variable is provided to a determination of optimum operating state module by a parameter vector.

11. A method for a coordinated control of mechanical, electrical and thermal power flows in a motor vehicle bringing about optimum operating states of at least one unit in the motor vehicle, the method comprising:
    determining, in a detection of driver intent module, at least one driver intent variable;
    generating, in a generation of setpoint variables module, at least one setpoint value as a function of combining the at least one driver intent variable and an additional specified variable;
    determining, in a determination of actual operating state module, an actual operating state as a function of at least one measured variable, the at least one measured variable determined from the state of the at least one unit of the unit system;

determining, in a determination of optimum operating state module, an optimum operating state for a unit system as a function of the at least one setpoint value and the actual operating state; and determining, in a determination of setpoint operating state module, a setpoint operating state for the unit system as a function of the actual operating state and the optimum operating state, wherein the setpoint operating state is used to generate a smooth transition between the actual operating state and the optimum operating state;

wherein the determining, in the determination of optimum operating state module, the optimum operating state step includes determining a plurality of possible operating states in real time during a vehicle operation so that the unit system supplies a required mechanical power, a required electrical power, and a required thermal power, and wherein for each possible operating state the value of a power function is determined according to computing rules:

$$G(x) = \gamma 1(a) * G1(x) + \gamma 2(a) * G2(x) + \gamma 3(a) * G3(x) + \gamma 4(a) * G4(x) + \gamma 5(a) * G5(x) + \gamma 6(a) * G6(x) + \gamma 7(a) * G7(x) + \gamma 8(a) * G8(x)$$

-continued and $$\Gamma(x) = V(x) - G(x) + \Delta P(x),$$

the operating state for which the power function assumes a minimum value specified as the optimum operating state.

12. The method according to claim 11, wherein in offline optimization calculations the optimum operating state which minimizes the power function is determined for each vehicle speed and each required combination of the required mechanical power, the required electrical power, and the required thermal power, the determination being made for various values of a parameter vector.

13. The method according to claim 12, wherein the optimum operating state is stored in a multidimensional characteristic map which is implemented in the determination of optimum operating state module, the multidimensional characteristic map containing input variables including the vehicle speed, the required mechanical power, the required electrical power, the required thermal power, and the parameter vector, and an output variable being the optimum operating state.

* * * * *

UNITED STATES PATENT AND TRADEMARK OFFICE
CERTIFICATE OF CORRECTION

PATENT NO. : 7,590,477 B2
APPLICATION NO. : 10/498189
DATED : September 15, 2009
INVENTOR(S) : Juergen Loeffler Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1270 days.

Signed and Sealed this

Twenty-first Day of September, 2010

David J. Kappos
*Director of the United States Patent and Trademark Office*